GIULIO NATTA
GIANFRANCO PREGAGLIA
GIORGIO MAZZANTI
MARCO BINAGHI
GIANCARLO POZZI
NINO ODDO
VALENTINO ZAMBONI
INVENTORS

GIULIO NATTA
GIANFRANCO PREGAGLIA
GIORGIO MAZZANTI
MARCO BINAGHI
GIANCARLO POZZI
NINO CODDO
VALENTINO ZAMBONI
INVENTORS

United States Patent Office 3,422,069
Patented Jan. 14, 1969

---

3,422,069
FORMALDEHYDE/KETENE COPOLYMERS
Giulio Natta, Gianfranco Pregaglia, and Giorgio Mazzanti, Milan, Marco Binaghi, Varese, Giancarlo Pozzi and Nino Oddo, Milan, and Valentino Zamboni, Varese, Italy, assignors to Montecatini Edison S.p.A. Milan, Italy
Continuation-in-part of application Ser. No. 265,584, Mar. 11, 1963. This application Aug. 8, 1966, Ser. No. 588,228
U.S. Cl. 260—64         15 Claims
Int. Cl. C08g 1/18

ABSTRACT OF THE DISCLOSURE

High molecular weight linear formaldehyde/ketene copolymers, the macromolecules of which consist of monomeric

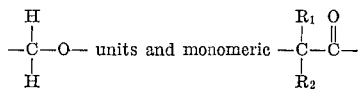

units, at least a portion of these two monomeric units being non-alternating, $R_1$ and $R_2$ being selected from the group consisting of alkyl radicals containing from about 1 to 6 carbon atoms, cycloalkyl radicals and phenyl radicals. Process for preparing these copolymers comprising reacting anhydrous formaldehyde with a ketene of the formula

wherein $R_1$ and $R_2$ are as above defined, in an anhydrous inert solvent selected from the group consisting of aliphatic hydrocarbons, cycloaliphatic hydrocarbons, aromatic hydrocarbons and ethers, at a temperature of from about $-100°$ C. to $+70°$ C., in the presence of a Lewis base catalyst.

---

This is a continuation-in-part of our application Ser. No. 265,584, filed Mar. 11, 1963 and now abandoned.

The invention relates to formaldehyde/ketene copolymers and to a process for preparing such copolymers.

We have found that alternating formaldehyde/ketene copolymers having a polyester structure can be obtained directly from formaldehyde and ketenes and that it is possible to obtain copolymers in which the ratios between the two monomers can be varied within very wide limits and which contain in the same macro molecule ester groups and polyacetal sequences.

The invention provides a process for preparing high molecular weight linear copolymers in which the macromolecules consist of monomeric

units and

monomeric units in which $R_1$ and $R_2$ may be alkyl, cycloalkyl or aryl groups, in any distribution, said copolymers having terminal groups selected from the group consisting of

and

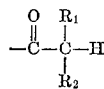

which process comprises reacting anhydrous formaldehyde ketene of the formula:

in which $R_1$ and $R_2$ are alkyl, cycloalkyl or aryl groups, in an anhydrous inert solvent, at a temperature between $-100°$ C. and $+70°$ C., and more preferably between $-80°$ C. and $+50°$ C., in the presence of a catalyst which is a Lewis base and contains an element from Group V of the Periodic Table, which catalyst either does not react with the monomer or, if it does react, maintains its basic character.

Such basic catalysts include aliphatic, aromatic or cycloaliphatic tertiary amines, pyridine, quinoline and phosphines. The first members of the aliphatic tertiary amine series with alkyl radicals containing 1 to 5 carbon atoms, such as trimethylamine, triethylamine, tripropylamine, methylethylpropylamine and diethylmonobutylamine have been found to be very active.

The amount of catalyst used is desirably from about 0.001 to 2%, and more preferably from about 0.01 to 1% by weight with respect to the inert solvent used in the polymerization.

Polymerization can be carried out in the absence of solvents, but it is generally preferable to reduce the concentration of the monomers by operating in solution in an anhydrous inert solvent.

Suitable solvents include organic solvents which do not react with the monomers or with the catalysts under the polymerization conditions and which, preferably, do not solidify at the reaction temperature. Typical of such solvents are aliphatic, cycloaliphatic or aromatic hydrocarbons such as propane, propene, butene-1, butene-2, isobutene, pentanes, n-heptane, iso-octane, toluene, or mixtures thereof, such as e.g., $C_4$ fraction obtained by petroleum cracking, petroleum ether, or ethers such as diethyl-ether and the like.

The polymerization is preferably carried out in the presence of low boiling solvents or of low boiling solvent mixtures by operating at the boiling point of the solvents.

Polymerization can be carried out under various operating conditions, either continuously or batchwise. For example, the catalyst or its solution can be added to the monomer mixture or to the monomer solution. In the copolymerization of dimethylketene a gaseous formaldehyde flow can be passed into an amine solution while dimethylketene in the liquid state is gradually added during the reaction.

Suitable ketenes of the formula

in which $R_1$ and $R_2$ have the aforementioned meaning, include dimethylketene, methylethylketene, diethylketene, dipropylketene, diisopropylketene, dibutylketene, dihexylketene, dicyclohexylketene, diphenylketene and the like.

Formaldehyde is used in the anhydrous state and may be either liquid or gaseous. In practice, such anhydrous formaldehyde contains less than 0.5% and preferably less than 0.1% of water. Such anhydrous formaldehyde can be obtained by any of the conventional processes, such as by pyrolysis of paraformaldehyde, or of a trioxane, or of a hemiformal.

The molar ratio between the two monomers (formaldehyde and ketene) can be varied within wide limits. The molar ratio exerts a remarkable influence on the course of the copolymerization and makes it possible to obtain a wide range of copolymers containing different proportions of the monomeric units in the macromolecules. By maintaining a ketene concentration which is higher than that of formaldehyde in the liquid phase in which the copolymerization takes place, when symmetrical ($R_1=R_2$) ketenes are used, crystalline copolymers having a polyester structure can be obtained in whose macromolecules the units derived from the two monomers follow one another alternately. By operating with a high excess of ketene and for very long reaction times, copolymers in which sequences of monomeric units are derived only from the ketenes can be obtained. By operating with a formaldehyde excess, on the other hand, we have obtained copolymers containing sequences of monomeric units deriving from formaldehyde and having the polyacetal structure, separated by ester groups:

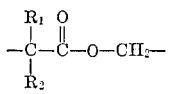

By varying the operating conditions and the rate of addition of the monomers, such ester groups can be inserted onto the polyacetal chains with a random distribution or block distribution such as with chain portions consisting of alternate polyesterpolyoxymethylene sequences. Copolymers in which the monomeric units derived from formaldehyde and a ketene are distributed in a non-alternating sequence are novel products.

The invention therefore includes high molecular weight linear copolymers in which the macromolecules contain monomeric —O—CH$_2$— units and monomeric units

in which $R_1$ and $R_2$ may be the same or different alkyl, cycloalkyl or aryl groups, these two different monomeric units being at least in part distributed in a non-alternating sequence. These novel polymers provided by the present invention may be represented by the formula

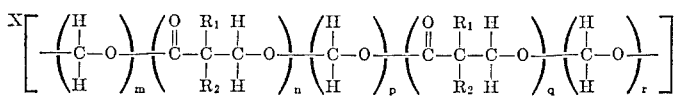

wherein $R_1$ and $R_2$ are each selected from the group consisting of alkyl radicals containing from about 1 to 6 carbon atoms, cycloalkyl radicals and phenyl radicals, $m$, $p$ and $r$ are each an integer from 1 to 300, $n$ and $q$ are each an integer from 1 to 50, and X and Y are terminal groups selected from the group consisting of

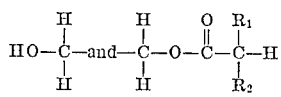

Among such copolymers are those whose macromolecules contain monomeric —O—CH$_2$— units and

monomeric units in a molar ratio higher than 1, where $R_1$ and $R_2$ are preferably methyl or phenyl; and copolymers whose macromolecules contain —O—CH$_2$— monomeric units and

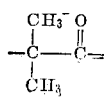

monomeric units, with the latter units in an amount less than 20% by weight, and preferably less than 10% by weight.

The structure of such copolymers is evident from the accompanying drawings in which.

Figure 1:
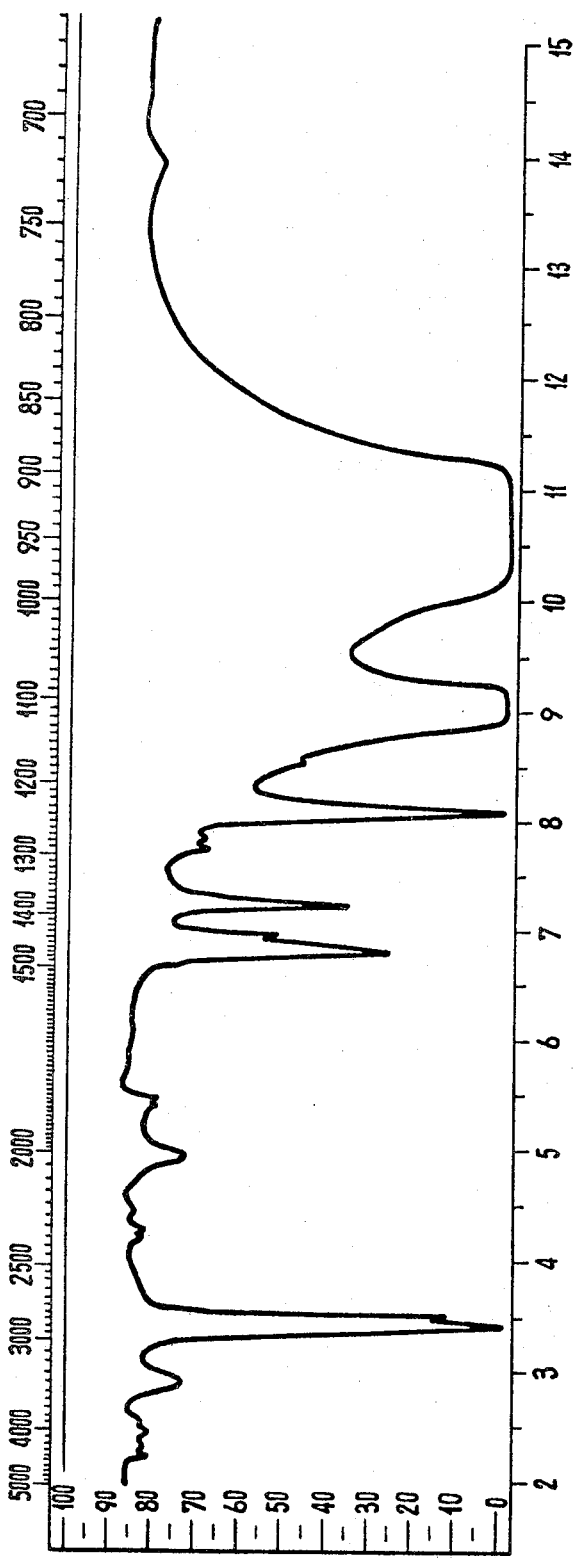
FIGURE 1 shows the infra-red spectrum of a pure polyoxymethylene sample.
Figure 2:
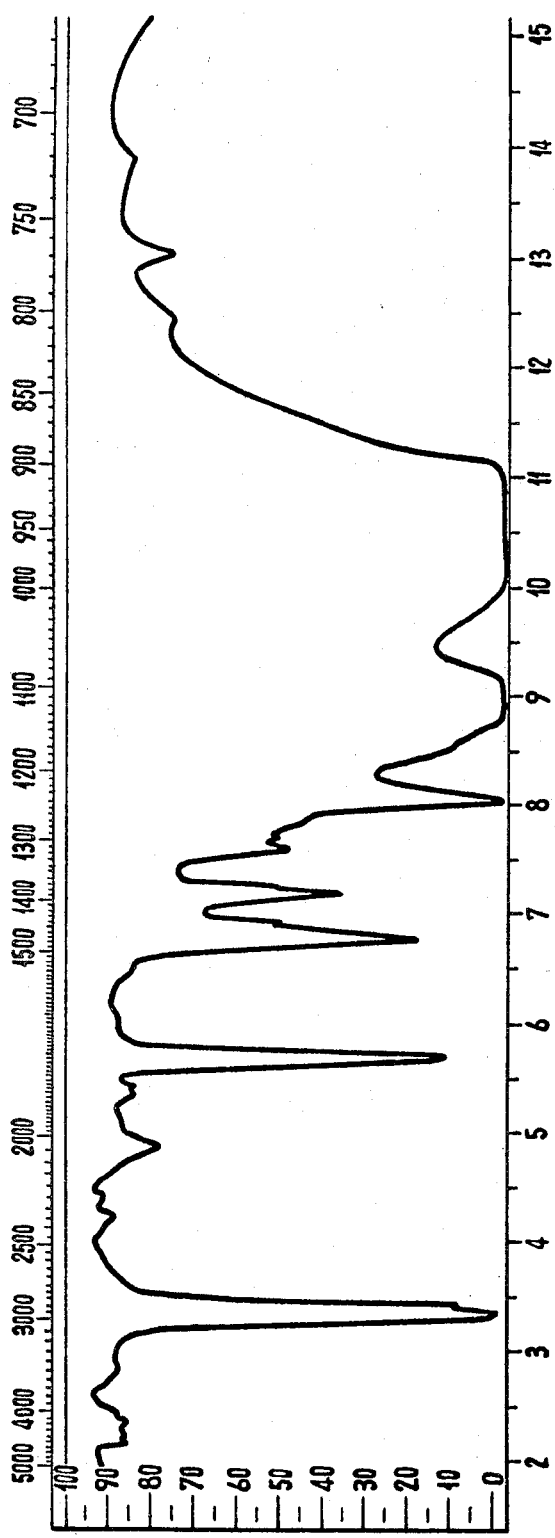
FIGURE 2 shows the infra-red spectrum of a non-alternating formaldehyde/dimethylketene copolymer obtained according to Example 1 hereinafter.
Figure 3:
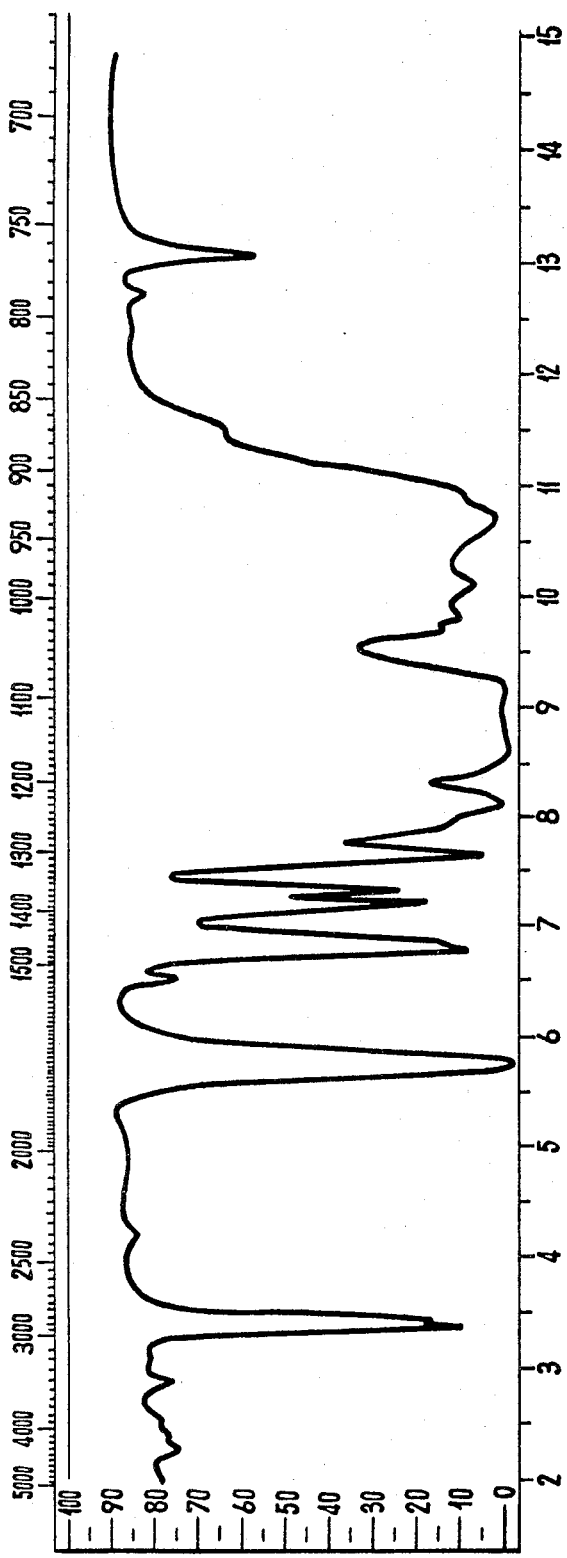
FIGURE 3 shows the infra-red spectrum of an alternating dimethylketene/formaldehyde copolymer having a polyester structure.
Figure 4A:
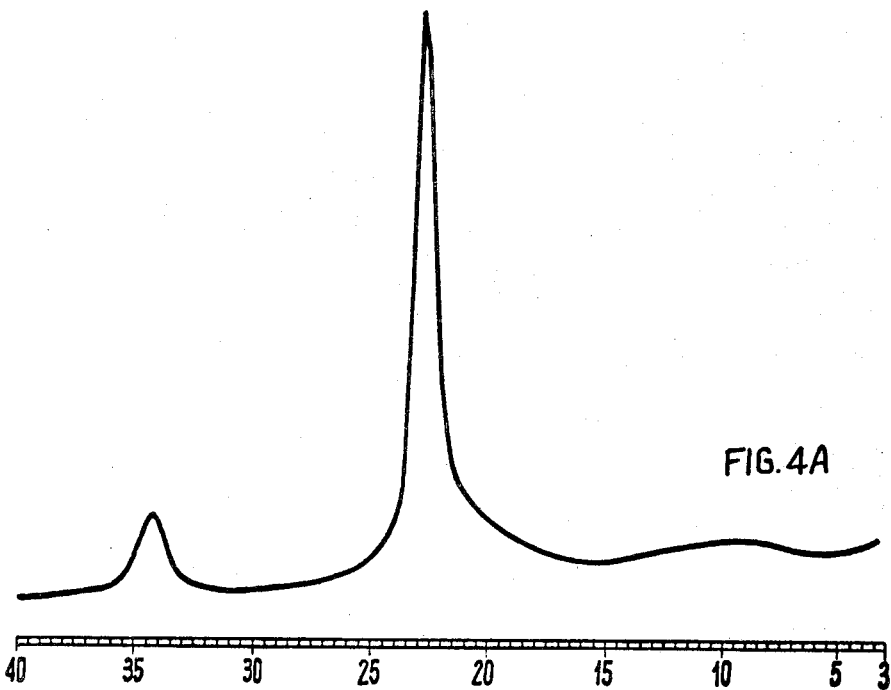
FIGURE 4 shows the X-ray diffraction spectra, registered with a Geiger counter, of a pure polyoxymethylene (A) and of an alternating formaldehyde/dimethylketene having a polyester structure (B).
Figure 4B:
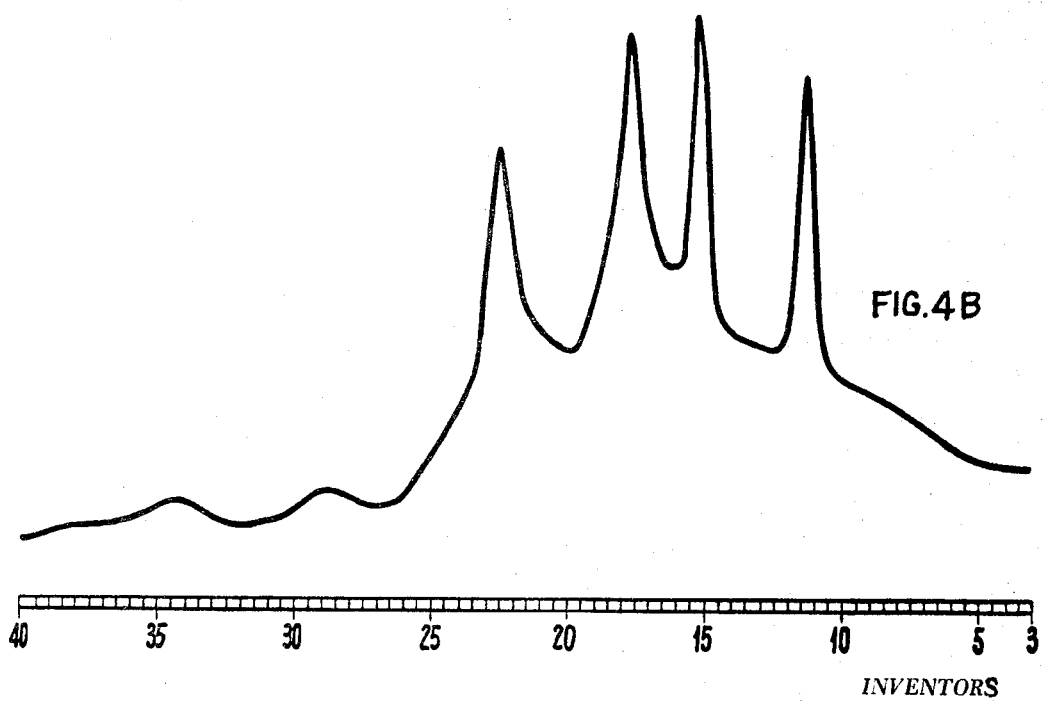

The samples for FIGURES 1 and 2 were prepared under similar reaction conditions. Their inherent viscosities are almost the same. It is clear that in the spectrum for the polymer of FIGURE 2 there are some particular absorptions in the zones at 5.76, 8.60, 11.55 and 13.08 microns, which cannot be ascribed to the polyoxymethylene chains (FIGURE 1), but rather are indicative of ester groups.

In Table 1 hereinbelow there are tabulated the properties of copolymers obtained from formaldehyde and dimethylketene compared with those of a pure polyoxymethylene prepared under the same conditions, including infra-red determinations of ester groups in the chains and of terminal hydroxyl groups. In particular, it should be noted that the number of terminal hydroxyl groups is considerably higher in pure polyoxymethylene. This demonstrates that in the copolymers some ester groups are chain terminals. From the data reported in Table 1 it will also be noted that the thermal stability of the non-alternating copolymers (FIGURE 2) is higher than that of pure polyoxymethylene. The percent crystallinity of the non-alternating copolymers containing less than 10% of units deriving from the ketene, as determined by X-ray examination, is practically equal to that of pure polyoxymethylene. On the other hand, the melting temperatures of such copolymers are slightly lower, and generally are between 140° and 175° C. This, from a practical point of view, is a considerable advantage since the mechanical properties of the non-alternating copolymer remain substantially the same as those of pure polyoxymethylene since their crystallinity is practically equivalent, yet the slightly lower melting point facilitates the processing of the polymer in the shaping of moulded articles, and reduces the tendency toward decomposition reactions.

The copolymers of the invention are useful in the field of plastics, particularly for making shaped articles. The highly crystalline copolymers obtained by alternating copolymerization, upon extrusion either in the molten state or as solutions, result in fibers which are capable of orientation by stretching. Such fibers present a high degree of crystallinity along the fiber axis and can be used as textile fibers. The non-alternating copolymers of the invention have a prevailingly polyacetal structure, and upon compression moulding at 160–180° C., produce homogeneous translucent films which have a high tenacity and resistance to successive bending. Thermally stable copolymers, rich in formaldehyde, can be obtained by varying the ratio between the two monomers during the polymerization and adopting operating conditions whereby the reaction proceeds rather slowly. It is thus possible to obtain macromolecules having a polyacetal structure but containing terminal blocks consisting of chain portions having polyester structure, consisting of alternating formaldehyde/ketene sequences.

The thermal stability of these copolymers having a prevailingly polyacetal structure can also be increased by successive chemical operations such as the blocking of terminal groups of polyoxymethylene sequences ending with a hemiacetal group. This blocking may be effected by acetylation. Antioxidants, thermal stabilizers, optical stabilizers, lubricants, plasticizers, pigments, etc., can be added to the copolymer in order to make it suitable for certain desired techniques or applications.

The properties of the copolymers reported in the examples were determined as follows:

(1) Inherent viscosity ($\eta$ inherent)

$$\eta_{inher.} = \frac{\ln \text{relative viscosity}}{C}$$

in which the relative viscosity is the ratio between the viscosity of the solution and that of the solvent and C is the solute concentration in grams per 100 cc. of solution. The determination was carried out in dimethylformamide containing 1% of diphenylamine, at 150° C. with concentrations of 0.5 g./100 cc.

(2) Weight loss at 160° C.

The determination was carried out by placing about 0.1 g. of product in an oven maintained at 160° C. in the presence of air and determining the percent weight loss of the sample after 60 minutes.

(3) Determination of terminal hydroxy groups and ester groups:
  (a) The percentage of hydroxy groups contained in the polymer is expressed as moles of —CH$_2$OH groups per 1,000 g. of polymer. The determination was carried out by infra-red absorption spectrography, on the basis of the intensity of the bands due to valance vibration of hydroxyl groups. The sample was examined as a lamina obtained by high pressure sintering, having a thickness of 0.1–0.2 mm. The thickness, measured with a comparimeter, was homogeneous throughout the whole lamina, with a tolerance of 10%.
  (b) The percentage of ester groups in the polymer, expressed as percentage of dimethylketene, was determined by infra-red absorption spectroscopy on the basis of the intensity of the band due to the valency vibrations of group:

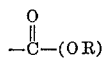

The sample was examined as a film, obtained by rapid melting of the sample having a thickness of about 0.1000 mm. in a press at 170° C.

The infra-red absorption was measured in a Perkin-Elmer double ray spectrophotometer with a sodium chloride prism, in the zone between 2.1 and 6.8 microns. The optical density found was divided by the absorption coefficient of the

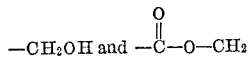

groups and by the thickness in microns.

(4) Melting point was determined under a polarizing microscope, with crossed Nichols, with a heating speed of 1 degree C./minute on a product crystallized after pre-melting.

(5) Constant thermal degradation.

The thermal stability was defined on the basis of the constant degradation rate at 222° C. under nitrogen. The test was carried out by means of an automatic-recording thermal weighing machine of the Eyraud type, by measuring the loss of volatile matter at 222° C. of 150 mg. of polymer until the residue was less than 40%.

The following examples will further illustrate the invention.

EXAMPLE 1

Air was removed from a glass reactor provided with a stirrer and maintained at 20° C., the removal being effected by repeated flushing with nitrogen and evacuation. 300 cc. of anhydrous toluene containing 10.36 cc. of dissolved triethylamine (0.1% by weight of the solvent) were then charged into the reactor under vacuum. The residual pressure in the reactor was about 100 mm. Hg.

Separately, 200 g. of substantially anhydrous cyclohexylformal were decomposed by heating at 135–145° C. The anhydrous gaseous formaldehyde thus developed was passed through three glass coils in series kept at —15° C. and then fed to the reactor containing the toluene. The decomposition temperature of the hemiformal was regulated so as to maintain a constant pressure of about 600 mm. Hg in the reactor. At the same time dimethylketene (a total of 5 cc.) was gradually fed into the reactor. After 20 minutes the feeding of the two monomers was stopped and the reaction mixture was kept at 20° C. for an additional 15 minutes while agitating. The pressure in the reactor during this period increased to the initial value. The copolymer suspension was vacuum filtered and the product was repeatedly washed with acetone and dried at 60° C. for 4 hours.

26 g. of product having the following properties were obtained:

Inherent viscosity _____ 1.3
Weight loss (at 160° C.) _____percent__ 2.0
Infra-red analysis:
    —CH$_2$OH groups _____mole/kg__ 0.08
    Copolymerized dimethylketene
                        Percent by weight__ About 2.5
Melting point _____° C__ 169

COMPARATIVE EXPERIMENT

For comparison an analogous preparation was carried out in the absence of dimethylketene. 20 g. of product having the following properties were obtained.

Inherent viscosity _____ 1.2
Weight loss (at 160° C.) _____percent__ 8
Infra-red analysis:
    —CH$_2$OH groups _____mole/kg__ 0.26
    Ester groups _____ Absent
Melting point _____degrees C__ 175

FIGURES 1 and 2 of the accompanying drawings show the infra-red spectra for these two products.

EXAMPLE 2

The conditions of Example 1 were maintained; however 10 cc. of dimethylketene were used in two batches, 5 cc. before starting the formaldehyde feed and 5 cc. at the end of the formaldehyde feeding.

21 g. of a product having the following properties were obtained:

Inherent viscosity _____ 0.9
Weight loss (at 160° C.) _____percent__ 5
Infra-red analysis:
    —CH$_2$OH groups _____mole/kg__ 0.06
    Copolymerized dimethylketene
                        percent by weight__ About 6.5
Melting point _____degrees C__ 160

EXAMPLE 3

Operating as described in Example 1, the addition rates and conditions of the two monomers were varied. The monomers were fed alternately for periods of 5 minutes, stopping the addition of one monomer during the feeding of the other. After 25 minutes the monomer feeding was stopped and the reaction mixture was kept at 20° C for a further 15 minutes while agitating.

A product having the following properties was obtained:

| | |
|---|---|
| Inherent viscosity | 1.1 |
| Weight loss (at 160° C.) _____ percent | 5 |
| Infra-red analysis: | |
| —$CH_2OH$ groups _____ mole/kg | 0.12 |
| Copolymerized dimethylketene percent by weight | About 3 |
| Melting point _____ ° C | 167 |

TABLE 1.—PROPERTIES OF FORMALDEHYDE-DIMETHYL KETENE COPOLYMERS

| Samples | Inherent viscosity | Terminal —$CH_2OH$ groups, mols/kg. | Copolymerized dimethylketene, percent by weight [1] | X-ray crystallinity percent | Constant of thermal degradation $K_{222}$ percent per minute |
|---|---|---|---|---|---|
| Ex. 1 | 1.3 | 0.08 | ca. 2.5 | 74 | 2.5 |
| Ex. 2 | 0.9 | 0.06 | ca. 6.5 | 76 | 2 |
| Ex. 3 | 1.1 | 0.12 | ca. 3 | 75 | 4 |
| Pure polyoxymethylene [2] | 1.2 | 0.26 | | 80 | 8 |

[1] 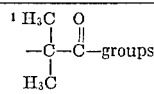
—groups

[2] Polyoxymethylene obtained under the same conditions as the preceding samples (see Example 1).

EXAMPLES 4, 5 AND 6

By operating as in Example 1 but using the catalysts listed in the following Table 2, polymers with the following properties were obtained.

TABLE 2

| Ex. No. | Catalyst | Concentration with respect to the solvent, percent by wt. | Polymer obtained, g. | Inherent viscosity | Infra-red analysis copolymerized dimethylketene, percent |
|---|---|---|---|---|---|
| 4 | Tributylamine | 0.2 | 20 | 1 | 3 |
| 5 | Hexamethylene tetramine | 0.1 | 14 | 0.7 | 3 |
| 6 | Pyridine | 0.3 | 24 | 1.9 | 3.5 |

EXAMPLE 7

A polymer obtained according to the procedure of Example 1 was acetylated with acetic anhydride under the following conditions:

3 g. of polymer and 30 cc. of 99.9% acetic anhydride were introduced into a glass vial. The vial was sealed over a flame under vacuum and was placed in thermostatic bath at 180° C. for 15 minutes. The vial was then cooled while agitating and opened. The polymer was recovered from the suspension by filtration and was then washed many times, first with acetone, then with water, and was finally dried.

2.7 g. of polymer were obtained. To this polymer 0.5% by weight of 4,4-butylidene-bis-(6-tertiary-butyl-3-methylphenol) and 2% by weight of a polyamide (copolymer consisting of 40% by weight of caprolactam and 60% of hexamethylenediamine adipic acid) were added. After homogenization of the stabilizer, the thermal stability of the polymer was determined and the following results were obtained:

Constant of thermal degradation $K_{222}$ (percent/minute)

| | |
|---|---|
| Polymer | 2.5 |
| Polymer acetylated and stabilized | 0.1 |

EXAMPLE 8

300 cc. of toluene and a glass vial containing 0.4 cc. of triethylamine ($N(C_2H_5)_3$) were introduced into a 500-cc. glass reactor at 20° C. under nitrogen. The internal pressure was reduced to 100 mm. Hg by connecting the reactor with a water pump and the vial was then broken under vacuum.

The reactor was connected to a generator of gaseous anhydrous formaldehyde and, immediately thereafter, 30 cc. of dimethylketene were quickly added through a dropping funnel. The feeding of gaseous formaldehyde was regulated so as to keep the pressure in the reactor at about 600 mm. Hg. The solution decolorized slowly. After 30 minutes the aldehyde feeding was stopped and agitation was continued for a further 15 minutes in order to consume the formaldehyde still present. The reaction product was treated with methanol, finely divided white polymer precipitating slowly. After repeated washing with methanol the polymer was filtered and dried at 40–50° C. under vacuum; it weighed 24 g.

The crude polymer, which was highly crystalline, melted at about 210° C. The infra-red spectrum showed the presence of a few polyoxymethylene sequences together with a high percentage (about 80 mole percent) of polyester structure. The intrinsic viscosity determined in tetrahydronaphthalene at 150° C., was 0.27. The polymer, on heating at 200° C. for 30 minutes, loses 5% of its weight.

EXAMPLE 9

300 cc. of toluene were introduced into a 500-cc. glass reactor provided with a cooling jacket, a propeller agitator and a dropping funnel. The temperature of the jacket was adjusted to —20° C. by circulating a solution of carbon dioxide in methanol and the reactor was brought to a pressure of 20 mm. Hg by connecting the apparatus to a water pump. 0.4 cc. of triethylamine were introduced under vacuum by means of a syringe through a rubber membrane, and the apparatus was connected to a gaseous formaldehyde generator. The feeding of gaseous formaldehyde was regulated so as to keep the pressure in the reactor at about 600 mm. Hg. Immediately thereafter, 30 cc. of dimethylketene were introduced while keeping the mass in agitation. After 10 minutes, an additional 20 cc. of dimethylketene were added to the almost colorless mass. The feeding of formaldehyde was continued for 10 minutes longer and the reaction was then stopped by adding methanol. The polymer was decanted and repeatedly washed with methanol and dried in the air at about 50° C. 29 g. of polymer were thereby obtained.

The infra-red spectrum showed the absence of a polyacetal structure in the polymer. The crude polymer melted at 215° C.

EXAMPLE 10

300 cc. of anhydrous toluene were introduced into a 500 cc. reactor provided with a jacket cooled at —20° C., an agitator, a dropping funnel and a formaldehyde inlet tube. The inner pressure was then adjusted to 20 mm. Hg by means of a water pump. While keeping the apparatus under vacuum, 4 cc. of a 1.1 molar solution of trimethylamine in toluene were introduced with a syringe through a rubber plug. Immediately thereafter, the introduction of gaseous formaldehyde was started and, at the same time, 50 cc. of dimethylketene were added through the dropping funnel. After 20 minutes, the introduction of formaldehyde was stopped and after an additional 5 minutes the mixture was taken up with methanol.

The precipitate, after repeated washing with methanol and drying in the air at 40° C., weighed 39 g. and was 94% soluble in boiling chloroform. The fraction soluble in chloroform had a melting point of 136° C. and, by infra-red examination, appeared to contain about 10% of formaldehyde, the monomeric units of which contain ester groups. Polyacetal sequences were absent.

EXAMPLE 11

300 cc. of anhydrous toluene was introduced into a 500 cc. reactor cooled by means of a jacket to 0° C. and equipped with a dropping funnel and a formaldehyde feed tube. The interior pressure was adjusted to about 20 mm. Hg by means of a water pump. While keeping the apparatus under vacuum, 0.4 cc. of triethylamine were injected with a syringe. Immediately thereafter, the introduction of gaseous formaldehyde (produced by a suitable generator) was commenced and, at the same time, 20 cc. of a 50% (by volume) solution of diphenylketene in toluene was added through the dropping funnel. By continuing the introduction of formaldehyde so that the internal pressure was maintained at about 600 mm. Hg, 5 cc. of a toluene solution of diphenylketene were added four times at intervals of 3 minutes, for a total of 20 cc. After 18 minutes the reaction was stopped by the addition of methanol. The amount of polymer, after repeated washing with methanol and drying in the air at 40° C., was 21 g. Its melting point was about 150° C.

EXAMPLE 12

A one-liter reactor provided with an agitator, cooling jacket, two dropping funnels, a formaldehyde inlet tube, and a tube connected with a device for maintaining the inner pressure of the reactor at a few mm. Hg above atmospheric pressure, was used. Air was removed from the reactor by repeated flushing with nitrogen; the cooling jacket was cooled to −30° C. and 450 cc. of anhydrous n-heptane were introduced into the reactor. 37.5 mg. of triphenyl phosphine dissolved in 50 cc. of n-heptane were introduced through one dropping funnel and 46 cc. of n-heptane and 4 cc. of dimethylketene were introduced through the other dropping funnel. As soon as the inner temperature reached −20° C. 14 cc. of triphenylphosphine solution were dropped from the first dropping funnel and immediately thereafter the introduction of gaseous anhydrous formaldehyde was commenced at a rate of 2.1 g./minute. At the same time, dimethylketene from the second dropping funnel was introduced at a rate of 2.5 cc./minute. After 2 minutes from the addition of the catalyst, and thereafter every 2 minutes, about 3 cc. triphenylphosphine solution were added. After 20 minutes from the beginning, excess methanol was added and the feeding of formaldehyde was stopped. The polymer was filtered, washed with methanol, and dried in air at 40° C. for 24 hours.

The properties of the product obtained are listed in Table II hereinafter.

EXAMPLE 13

The apparatus of Example 12 was used with the same technique but with the following variations:

(1) 30 mg. of triphenyl phosphine in 50 cc. of n-heptane were placed in the first dropping funnel.
(2) 47 cc. of n-heptane and 3 cc. of dimethylketene were placed in the second dropping funnel.
(3) At the beginning of the polymerization, 15 cc. of triphenylphosphine solution were introduced and then, every 2 minutes, an additional 5 cc. were added.
(4) The dimethylketene solution was fed at the rate of 3.4 cc./minute.
(5) Gaseous formaldehyde was fed at the rate of 3 g./minute.
(6) The polymerization was stopped after 15 minutes from the beginning.

The properties of the product obtained are listed in Table II.

EXAMPLE 14

The polymerization was carried out in the apparatus and with the technique of Example 13 but keeping the cooling jacket at +10° C. The properties of the product obtained are listed in Table II.

EXAMPLE 15

The procedure of Example 13 was used but the catalyst solution was added in two portions of 25 cc., one at the beginning and the other after 8 minutes. The properties of the product obtained are listed in Table II.

EXAMPLE 16

The procedure of Example 13 was used but instead of the triphenylphosphine solution, a solution of 0.016 cc. of triethylamine in 50 cc. of n-heptane was used. The properties of the product obtained are listed in Table II.

EXAMPLE 17

By operating as in Example 13, a solution of 0.016 cc. of triethylamine in 50 cc. of n-heptane was used and all the catalyst was added at the beginning of the polymerization.

In the copolymers obtained in Examples 12 to 17 a fraction was present which is unstable at 160° C. and consisting of low molecular weight formaldehyde homopolymers. This fraction was removed by heating to 165° C. for 6 hours. The properties of the purified polymers are listed in Table II.

TABLE II

| Ex. | Crude polymer, g. | Fraction unstable at 165° C., percent by weight | Terminal CH$_2$OH, mols/kg. | Copolymerized dimethylketene, percent by weight | Inherent viscosity | Thermal degradation constant K$_{222}$ (percent min.) |
|---|---|---|---|---|---|---|
| 12 | 45.3 | 25 | 0.05 | 3.7 | 0.6 | 0.15 |
| 13 | 43 | 20 | 0.04 | 2.4 | 0.63 | 0.21 |
| 14 | 34 | 16 | 0.035 | 1.6 | 0.73 | 0.12 |
| 15 | 37 | 18 | 0.045 | 2.5 | 0.57 | 0.24 |
| 16 | 44 | 27 | 0.045 | 2.6 | 0.65 | 0.05 |
| 17 | 46 | 24 | 0.04 | 2.6 | 0.57 | 0.08 |

EXAMPLE 18

A 1 liter reactor provided with an agitator, cooling jacket, two dropping funnels, a formaldehyde inlet tube, and reflux condenser was used. At the top of the reflux condenser a device was connected for maintaining the inner pressure of the reactor at a few mm. Hg above atmospheric pressure.

Air was removed from the reactor by repeated flushing with nitrogen and then the cooling jacket was cooled to −10° C. and methanol cooled to −70° C. was circulated in the condenser.

450 cc. of anhydrous butene-1 were introduced into the reactor, while 56 mg. of tributylamine diluted with 50 cc. of n-heptane were introduced into one of the two funnels; into the other funnel there were contemporaneously introduced 4 cc. of dimethylketene and 46 cc. of n-heptane. The reactor was connected to the formaldehyde generator (2.7 g. CH$_2$O/minute) and contemporaneously 15 cc. of the tributylamine solution and 15 cc. of the dimethylketene solution were introduced into the reactor through the funnels. The remainders of the solutions were then contemporaneously added at the rate of 5 cc. per 2 minute interval. After 15 minutes from the beginning, the polymerization was interrupted by addition of methanol.

The separated polymer was washed with methanol and dried in air at 40° C. for 24 hours, to produce 40.5 g. of polymer having the following characteristics:

Unstable fraction at 165° C. _____percent__ 16
Degradation at 222° C. (percent per minute)_____ 0.06
Inherent viscosity _____ 0.6

EXAMPLE 19

The same apparatus described in Example 18 was used, but a mixture consisting of 250 cc. of n-heptane and 200 cc. of butene-1 was used as the solvent. The characteristics of the thus obtained polymer are listed in Table III.

EXAMPLE 20

The operation was carried out as described in Example 18 but the reactor jacket was cooled to −50° C. and 450 cc. of propylene were used as solvent. The characteristics of the thus obtained polymer are reported in Table III.

EXAMPLE 21

The polymerization was carried out as described in Example 18, but the solvent was 450 cc. of petroleum ether having a boiling point between 30 and 50° C. The reactor was not cooled by means of the jacket.

The characteristics of the thus obtained polymer are reported in Table III.

EXAMPLE 22

The operation was carried out as described in Example 18 using as the solvent 450 cc. of a mixture consisting of hydrocarbons containing 4 carbon atoms and obtained by the fractionation of the products from petroleum cracking.

The characteristics of the thus obtained polymer are reported in Table III.

TABLE III

| Ex. | Polymer, g. | Unstable fraction at 165° C, percent by wt. | Thermal stability $K_{222}$ | Inherent viscosity | Percent of dimethylketene in the copolymer |
|---|---|---|---|---|---|
| 19 | 36.8 | 10 | 0.1 | 1.24 | 2.8 |
| 20 | 34 | 12 | 0.1 | 0.8 | 3.2 |
| 21 | 24 | 15 | 0.08 | 0.6 | 3.2 |
| 22 | 38 | 12 | 0.08 | 0.84 | 3.1 |

Variations can, of course, be made without departing from the spirit of our invention.

Having thus described the invention, what it is desired to secure and claim by Letters Patent is:

1. High molecular weight linear formaldehyde/ketoketene copolymers in which the macromolecules consist of monomeric $$-\underset{\underset{H}{|}}{\overset{\overset{H}{|}}{C}}-O-$$

units and monomeric

units and wherein at least a portion of said two monomeric units are non-alternating, said copolymers having the formula:

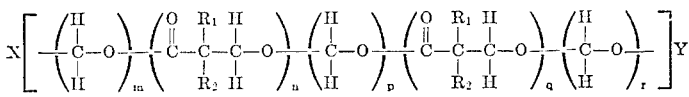

wherein $R_1$ and $R_2$ are each selected from the group consisting of alkyl radicals containing from about 1 to 6 carbon atoms, cycloalkyl radicals and phenyl radicals, $m$, $p$ and $r$ are each an integer from 1 to 300, $n$ and $q$ are each an integer from 1 to 50, and X and Y are terminal groups selected from the group consisting of

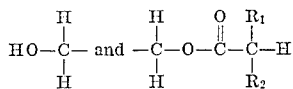

2. The copolymers of claim 1, wherein the macromolecules thereof contain the monomeric units

in a proportion of less than 10% by weight.

3. The copolymers of claim 1, wherein $R_1$ and $R_2$ are methyl.

4. The copolymers of claim 1, wherein $R_1$ and $R_2$ are phenyl.

5. A method of preparing high molecular weight linear formaldehyde/ketoketene copolymers in which the macromolecules consist of monomeric

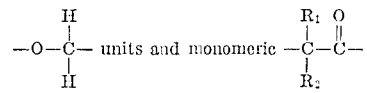

units in which $R_1$ and $R_2$ are selected from the group consisting of alkyl having from about 1 to 6 carbon atoms, cycloalkyl and phenyl said copolymers having terminal groups selected from the group consisting of

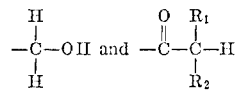

which comprises reacting anhydrous formaldehyde with a ketene of the formula

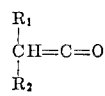

wherein $R_1$ and $R_2$ are as above defined, in an anhydrous inert solvent selected from the group consisting of aliphatic hydrocarbons, cycloaliphatic hydrocarbons, aromatic hydrocarbons and ethers, at a temperature of from about −100° C. to +70° C. in the presence of a catalyst comprising a Lewis base selected from the group consisting of tertiary aliphatic amines, aromatic amines, cycloaliphatic amines, pyridine, quinoline and phosphines.

6. The method of claim 5 carried out at a temperature of from about −80° C. to +50° C.

7. The method of claim 5, wherein the polymerization is carried out in the presence of a low-boiling aliphatic solvent at the boiling point of said solvent.

8. The method of claim 5, wherein the tertiary aliphatic amine is trimethyl amine.

9. The method of claim 5, wherein the tertiary aliphatic amine is triethylamine.

10. The method of claim 5, wherein the tertiary aliphatic amine is selected from the group consisting of tripropylamine and tributylamine.

11. The method of claim 5, wherein the catalyst is pyridine.

12. The method of claim 5, wherein the catalyst is a phosphine.

13. The acetylated product of claim 1.
14. The product of claim 1 in film form.
15. The product of claim 1 in fiber form.

References Cited

UNITED STATES PATENTS

| | | | |
|---|---|---|---|
| 2,356,459 | 8/1944 | Kung | 260—344 |
| 2,361,036 | 10/1944 | Kung | 260—526 |
| 2,964,500 | 12/1960 | Jenkins et al. | 260—67 |

WILLIAM H. SHORT, *Primary Examiner.*

L. LEE, *Assistant Examiner.*

U.S. Cl. X.R.

260—45.9, 45.95

UNITED STATES PATENT OFFICE
CERTIFICATE OF CORRECTION

Patent No. 3,422,069    January 14, 1969

Giulio Natta et al.

It is certified that error appears in the above identified patent and that said Letters Patent are hereby corrected as shown below:

Column 1, line 51, "macro molecule" should read -- macromolecule --.
Column 2, line 7, "hyde ketene" should read -- hyde with a ketene --. Column 3, lines 45 to 50, the portion of the formula reading:

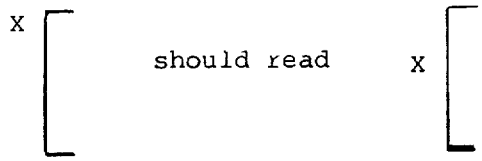

same formula, the portion reading:

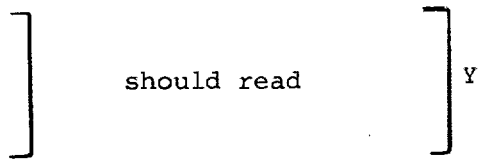

Column 5, line 69, "Constant thermal" should read -- Constant of thermal --.
Column 6, line 23, "period increased" should read -- period decreased --.
Column 7, line 3, "5" should read -- 6 --; line 59, "hexamethylenediamine adipic" should read -- hexamethylenediamine + adipic --. Column 9, line 25, insert a comma after "-20° C.". Column 12, line 16, insert a comma after "phenyl"; lines 25 to 29, the formula should appear as shown below:

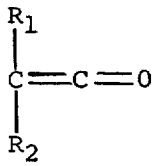

Signed and sealed this 17th day of March 1970.

(SEAL)
Attest:

EDWARD M. FLETCHER, JR.
Attesting Officer

WILLIAM E. SCHUYLER, JR
Commissioner of Patents